Oct. 15, 1946.    R. A. VOGT    2,409,602
AUTOMOBILE WHEEL CLAMP
Filed Oct. 13, 1945
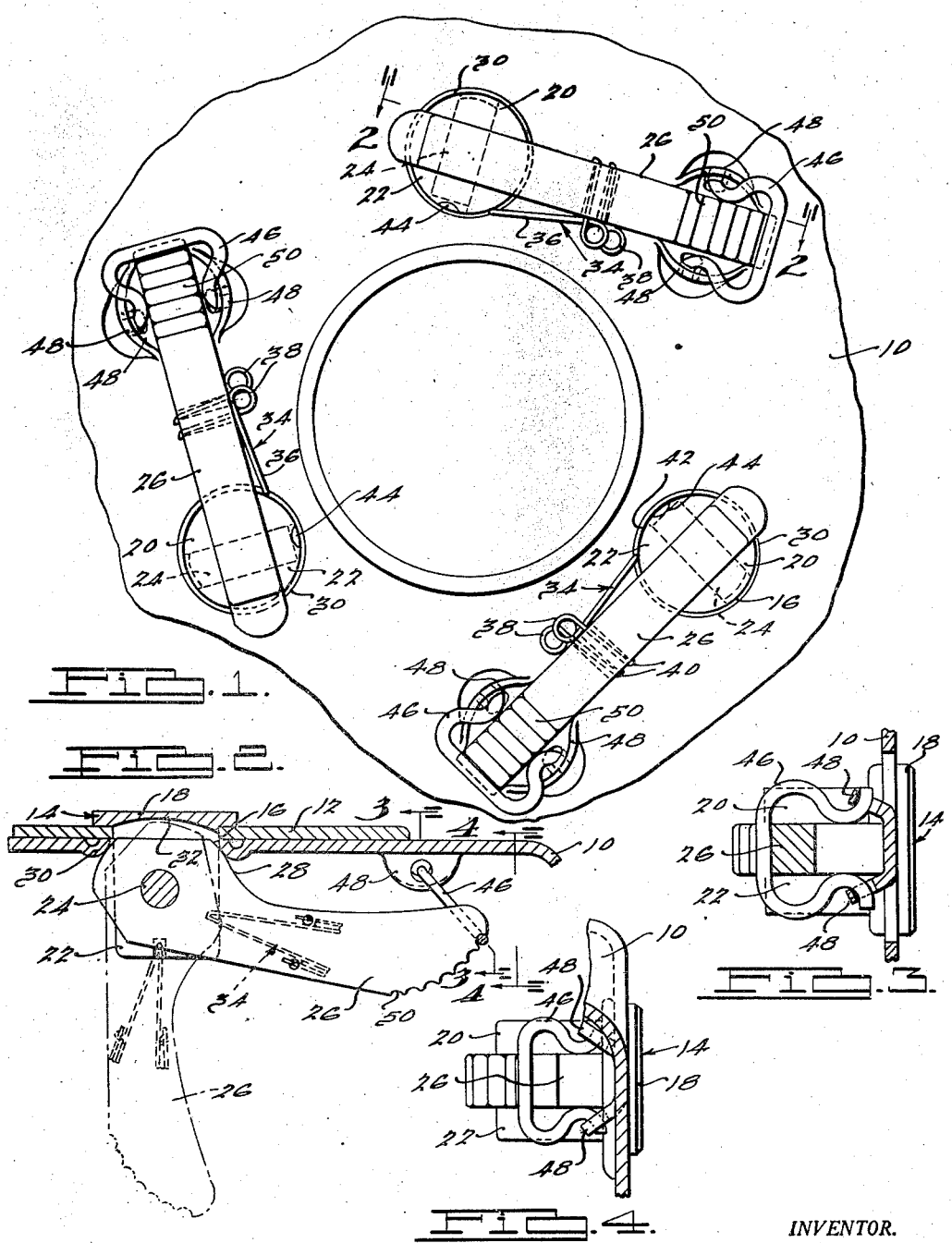

Patented Oct. 15, 1946

2,409,602

UNITED STATES PATENT OFFICE 2,409,602

AUTOMOBILE WHEEL CLAMP

Ralph A. Vogt, Berkeley, Mich.

Application October 13, 1945, Serial No. 622,134

8 Claims. (Cl. 301—9)

1

The invention relates broadly to a vehicle wheel assembly and more particularly to an improved mechanism for holding the wheel on the hub.

Heretofore, it has been conventional practice to attach a vehicle wheel to the hub by threaded studs which are carried by the latter and extend through openings in the wheel. Nuts on the studs at the outer sides of the wheel are adapted to be tightened against the wheel to hold it securely in place.

Although generally satisfactory this arrangement is subject to the certain disadvantages. For example, special tools are necessary to remove or replace the wheel. These operations usually require considerable time since the nuts must be individually unscrewed from the studs when the wheel is removed and then screwed back on the studs when the wheel is replaced. Moreover, it is necessary to remove the nuts from the studs and, consequently, they are easily lost.

An important object of the present invention is to provide a vehicle wheel assembly that permits the wheel to be removed from the hub and replaced without the use of tools.

Another object of the invention is to provide a wheel assembly in which all parts of the assembly are permanently attached either to the wheel or to the wheel hub thus eliminating possibility of any part being lost when the wheel is removed.

Still another object of the invention is to provide a novel vehicle wheel assembly that will greatly expedite the task of removing or applying the wheel.

Yet another object of the invention is to provide a vehicle wheel assembly of the above-mentioned character that is simple in construction and efficient in operation.

Other objects and advantages of the invention will be apparent during the course of the following description.

In the drawing forming a part of this specification and wherein like numerals are employed to designate like parts throughout the same, Figure 1 is a fragmentary front elevation of a wheel assembly embodying the invention and showing wheel-clamping means positioned to hold the wheel securely on the hub, Figure 2 is a fragmentary, longitudinal sectional view taken on the line 2—2 of Figure 2, Figure 3 is a fragmentary, transverse sectional view taken on the line 3—3 of Figure 2, and Figure 4 is a fragmentary, transverse sectional view taken on the line 4—4 of Figure 2.

Considered in certain of its broader aspects the invention comprises pivoted levers carried by the wheel hub and located to align with openings in the wheel. When positioned to extend outwardly from the hub the levers pass readily through the wheel openings. After the wheel has been positioned against the hub, the levers are

2 pushed over or swung toward the wheel to move cam surfaces at their pivoted ends against the edges of the wheel openings and thus clamp the wheel securely against the hub. Additional features of the invention comprise detents carried by the levers and operative to hold the same extended and catch means for holding the levers in the wheel clamping position.

From the foregoing it will readily be apparent that to remove the wheel it is merely necessary to straighten the levers and pull the wheel directly away from the hub. Conversely, to replace the wheel it is merely necessary to push the wheel over the levers when the latter are extended and then push the levers over to the wheel-clamping position.

For a more detailed description of the invention reference is had to the accompanying drawing wherein the numerals 10 and 12 designate a wheel and a wheel hub, respectively. Insofar as the present invention is concerned these parts may be of conventional shape and construction and a detailed illustration and description is therefore unnecessary.

Mounted on the hub 12 are three concentrically arranged, substantially equispaced clevises 14 which project forwardly and are adapted to pass through aligning opening 16 in the wheel 10. Each of the clevises 14 comprises a base 18 which is welded or otherwise attached to the rear surface of hub 12 and a pair of laterally spaced arms 20 and 22 which extend forwardly through suitable openings provided in the hub.

Mounted between the clevis arms 20 and 22 and on transverse pivot pins 24 are levers 26. When in the extended position shown by dot and dash lines in Figure 2, these levers are adapted to pass through the wheel openings 16 and, when in the transverse or pushed-over position shown by full lines in Figure 2, are adapted to engage the wheel 10 at the edges of the openings and to hold the same solidly against the hub 12. It will be observed that the pivoted ends of the levers 26 are provided at one side of the pivot pins 24 with cam surfaces 28 which press against the wheel 10 to hold it against the hub 12. The openings 16 are preferably formed with marginal beads 30 against which the cam surfaces 28 press. These beads present curved bearing surfaces to and facilitate manipulation of the levers 26 and eliminate sharp edges at the peripheries of the openings which might cut or indent the cam surfaces 28. As suggested, when the levers 26 are extended, cam surfaces 28 are positioned to pass through the wheel openings 16. If necessary, the inner surfaces of the bases 18 between arms 20 and 22 can be dished, as at 32, to accommodate the levers.

Since the wheel 10 can be removed or replaced only when the levers 26 are extended, each of the latter is provided with a detent 34 for releasably holding it in this position. Each of the detents 34 comprises a U-shaped spring arm 36 having looped portions 38 and laterally extending ends 40. The latter extend through openings provided in its respective lever and the projecting portions thereof are bent over to hold the detent attached thereto. As best shown in Figure 1, the free ends of spring arms 36 bear against the adjacent clevis arms 22. The latter preferably are formed with curved surfaces 42 and provided at substantially their middle with notches 44. When the levers 26 are positioned in the wheel clamping position, spring arms 36 engage the curved surfaces 42 and hold the looped portions 38 under tension. As the levers 26 are swung to the extended position the spring arms 36 ride outwardly on the surfaces 42 and automatically enter the notches 44 to releasably hold the levers extended.

Catch members 46 are mounted on the wheel 10 adjacent the distal ends of levers 26 and coact with the latter to hold them in the wheel clamping position. The catch members 46 are generally loop shaped and may be fashioned from any suitable metal rod of relatively small diameter. As best shown in Fig. 3, the ends of the catch members 46 are journaled in lugs 48 which preferably comprise ears struck upwardly from the wheel 10. These catch members are adapted to engage serrations 50 in the top surfaces of the levers and thus prevent them from inadvertently releasing the wheel.

It is to be understood that the form of the invention herewith shown and described is to be taken as a preferred embodiment thereof and that various changes in the size, shape and arrangement of parts may be resorted to without departing from the spirit of the invention or the scope of the appended claims.

Having thus described the invention, I claim:

1. A vehicle wheel assembly comprising a wheel provided with a plurality of openings; a support for the wheel; and pivoted levers carried by said support and located to align with the openings, said levers adapted to pass through the openings when positioned to extend outwardly from the support and having cam surfaces which engage the wheel at the edges of the openings when the levers are swung toward the support whereby to hold the wheel securely on the support.

2. A vehicle wheel assembly comprising a wheel provided with a plurality of openings; a support for the wheel; pivoted levers carried by said support and located to align with the openings, said levers adapted to pass through the openings when positioned to extend outwardly from the support and having cam surfaces which engage the wheel at the edges of the openings when the levers are swung toward the support whereby to hold the wheel securely on the support; and catch means for holding the levers in the wheel engaging position.

3. A vehicle wheel assembly comprising a wheel provided with a plurality of openings; a support for the wheel; pivoted levers carried by said support and located to align with the openings, said levers adapted to pass through the openings when positioned to extend outwardly from the support and having cam surfaces which engage the wheel at the edges of the openings when the levers are swung toward the support whereby to hold the wheel securely on the support; serrations at the swinging ends of said levers; and pivoted catch means carried by the wheel adapted to receive the levers and interlock with said serrations when said levers are in the wheel engaging position.

4. A vehicle wheel assembly comprising a wheel provided with a plurality of openings; a support for the wheel; pivoted levers carried by the support and located to align with the openings, said levers adapted to pass through the openings when positioned to extend outwardly from the support; and means for releasably holding the levers in the extended position, each of said levers having cam surfaces which engage the wheels at the edges of the openings when the levers are swung toward the support whereby to hold the wheel securely on the support.

5. A vehicle wheel assembly comprising a wheel provided with a plurality of openings; a support for the wheel; pivoted levers carried by the support and located to align with the openings, said levers adapted to pass through the openings when positioned to extend outwardly from the support and having cam surfaces which engage the wheels at the edges of the openings when the levers are swung toward the support whereby to hold the wheel securely on the support; and detent means for releasably holding the levers in the extended position.

6. A vehicle wheel assembly comprising a wheel provided with a plurality of openings; a support for the wheels; clevis members mounted on the support and located to align with the openings; and levers pivoted to said clevis members adapted to pass through the openings when positioned to extend outwardly from the support, said levers having cam surfaces which engage the wheels at the edges of the openings when said levers are swung toward the support whereby to hold the wheel securely on the support.

7. A vehicle wheel assembly comprising a wheel provided with a plurality of openings; a support for the wheel; clevis members mounted on the support and located to align with the openings, at least one arm of each clevis having a recess; levers pivoted to the clevises, said levers adapted to pass through the openings when positioned to extend outwardly from the support and having cam surfaces which engage the wheels at the edges of the openings when the levers are swung toward the support whereby to hold the wheels securely on the support; and detent means carried by the levers adapted to enter said recesses when the levers are in extended positions and to hold the levers so positioned.

8. A vehicle wheel assembly comprising a wheel provided with a plurality of openings; a support for the wheel; clevis members mounted on the support and located to align with the openings, at least one arm of each clevis having a curved wall portion provided with a recess; levers pivoted to said clevises adapted to pass through the openings when positioned to extend outwardly from the support and having cam surfaces which engage the wheels at the edges of the openings when the levers are swung toward the support whereby to hold the wheel securely on the support; and spring arms carried by the levers, the distal ends of said spring arms disposed to engage the curved wall portions of said clevises and to be guided into said recesses by the wall portions when the levers are swung to extended positions whereby releasably to hold the levers so positioned.

RALPH A. VOGT.